United States Patent [19]
Droll et al.

[11] Patent Number: 4,648,927
[45] Date of Patent: Mar. 10, 1987

[54] METHOD AND DEVICE FOR PRODUCTION OF COVER STRIPS FOR INSERTION INTO THE GROOVES OF STATORS OF ELECTRIC MACHINES

[76] Inventors: Hans Droll, Nordring 76, 6000 Frankfurt 60; Dieter Fessler, Kiefernweg 1, 6380 Bad Homburg, both of Fed. Rep. of Germany

[21] Appl. No.: 742,704

[22] Filed: Jun. 7, 1985

[30] Foreign Application Priority Data

Jun. 8, 1984 [DE] Fed. Rep. of Germany ....... 3421428

[51] Int. Cl.⁴ .................... B65H 19/14; B65H 19/20; B65H 69/06
[52] U.S. Cl. .................... 156/159; 156/504; 242/56 R; 242/58.2; 242/58.3; 242/58.4
[58] Field of Search .................... 156/157, 159, 304.3, 156/502, 504, 505; 242/58.2, 58.3, 58.1, 58.4, 58.6, 56 R

[56] References Cited

U.S. PATENT DOCUMENTS

| | | | |
|---|---|---|---|
| 4,204,898 | 5/1980 | King | 156/159 |
| 4,392,912 | 7/1983 | Horsley | 242/58.4 |
| 4,473,430 | 9/1984 | Voltmer et al. | 156/505 |
| 4,501,630 | 2/1985 | Kiuchi | 156/505 |
| 4,543,149 | 9/1985 | Abe et al. | 242/58.2 |

*Primary Examiner*—Michael Wityshyn
*Attorney, Agent, or Firm*—Larson and Taylor

[57] ABSTRACT

A method and device for the production of cover strips which are to be inserted into the grooves of stators of electric machines, from a supply of strip material provided on delivery rolls. The guide channel (26) for cover strip material (12) has several feed passages (46, 46'), which can be brought individually into connection one after the other with the main part of guide channel (26). Thus it is possible to thread the lead of a new delivery roll into its feed passage (46, 46') of the guide channel while the machine continues to run, so that when delivery rolls (16, 16') are to be changed, only a mechanical change of position of feed passages (46, 46') need be undertaken. The down time of the machine is thus greatly shortened.

11 Claims, 4 Drawing Figures

METHOD AND DEVICE FOR PRODUCTION OF COVER STRIPS FOR INSERTION INTO THE GROOVES OF STATORS OF ELECTRIC MACHINES

The invention relates to a method for production of insulating cover strips which are to be inserted into the grooves of stators of electric machines. The original supply of strip material is provided on delivery rolls. The strip material is fed from its roll to a cutting tool by feed members arranged in a guide channel. The invention also relates to a device which is suitable for implementation of this method.

The delivery rolls can carry only a limited length of approximately 400 to 500 meters of cover strip material. Modern manufacturing plants consume this supply in approximately 1 to 1.5 hours. At present, the plant would then have to be shut down for approximately five minutes in order to draw the end of the strip material from the consumed delivery roll out of the guide channel and to thread in the lead of the strip material from the next delivery roll. The down time, which amounts to approximately 6 to 8% of the entire manufacturing time, is an especially damaging stoppage in interlinking systems in which for example several winding machines which are producing the windings of the stators are linked with an insertion device which draws the wire windings into the stators and also simultaneously inserts the cover strips in the stator grooves.

The object of the invention is to shorten the down time caused by the change of delivery rolls, and for the solution of this problem it is suggested that the strip material from several delivery rolls each be introduced into one of several feed passages of the guide channel and, during the transfer from one delivery roll to the next, its strip material is positioned by controlled movement of the feed passages holding these strips relative to the main part of the guide channel.

The method according to the invention offers the advantage that the threading of the lead of the subsequent delivery roll into a feed passage of the guide channel can take place already while the cover strip material is still being drawn from the other deliver roll. If this then continues to the end, the processes required for shifting the next deliver roll is carried out mechanically and automatically, i.e. very rapidly.

In the preferred embodiment of the invention, for straightening of the lead of a strip of material which is held in a feed passage, in alignment with the adjacent passage of the guide channel, the end of the preceding delivery roll lying therein is drawn out to the rear. This method can be carried out very simply and without difficulty since both the consumed and the new strip material are picked up in the feed passage of the guide channel by transport members and can be drawn back or thrust forward.

If even the small loss of cover strip material of the delivery roll involved with drawing back the end is to be avoided, as an alternative to the last method, the possibility exists that for the straightening of the lead of a strip of material held in a feed passage in alignment with the connecting passage of the guide channel, the end of the preceding delivery roll lying therein is cut off and is welded together with the lead of the next delivery roll.

Difficulties could arise in such cases, because with this method the weld point could occur at some random point on a cover strip. In another variation of the method according to the invention, which solves this problem, the end of the preceding delivery roll can be drawn out to the rear for some length from the guide channel and then be cut off and welded together with the lead to the next delivery roll, so that with the separation of the cover strip, the weld point occurs at one end of a cover strip.

The device according to the invention for implementation of the aforementioned method arises from known devices comprising a guide channel between a cover strip material delivery roll and a cutting tool, separating the cover strips, and is characterized in that the guide channel has several feed sections which can be positioned separately in alignment with the main part of the channel by relative movement, and reversible feed members are arranged at the feed passages when it is in this alignment position. With change of the delivery roll, the reversible feed members could draw the end of the consumed delivery roll back entirely or partially, and the other feed passage could most rapidly change position to form an attachment to the other part of the guide channel by means of a controlled mechanical setting mechanism and/or step-setting.

The operation relates only to the relative movement between the feed passages on the one hand and the main part of the guide channel on the other hand. Preferably, however, the last is constructed as stationary and for simplicity all of the feed passages—normally 2 to 4 suffice, but more could be provided are constructed as a common movable unit and the feed passages can be aligned and connected individually by common parallel sliding to the main part of the guide channel.

Holders for rotatable mounting of the delivery rolls could also move with this unit, so that the reciporcal spatial alignment between the delivery rolls and their associated feed passages remains unchanged whatever the position of the movable unit.

In another preferred embodiment of the invention, transport rolls, which can be driven into connection position in both directions of rotation, and also blades, are mounted in each feed passage of the guide channel, which provide clean, precise cutting off of the outside front end of a fresh delivery spool, and by the cutting allow an exact positioning of the front end of the material. This blade could also be used on the feed passages for cutting off the end of a consumed delivery roll lying in the guide channel before welding it with the front end of the subsequent delivery roll.

Especially at the beginning, the delivery rolls have quite a large mass moment of inertia. Thus it is known to mount a side opening on the guide channel, through which a loop can protrude, and to arrange controllable feed members in the form of transport rollers or transport pawls before as well as after the loop. The side of the loop can be monitored e.g. by a light sensor. The feed members downstream of the loop draw cover strip material down out of the loop practically inertialess and guide it to the cutting tool separating the cover strips. The feed members upstream from the feed loop draw cover strip material down from the delivery roll and guide it to the loop. They are controlled dependent upon the light source. In order also to be able to use the invention in a device of this type, it is provided in a practical embodiment that the opening through which the loop comes out of the guide channel can be closed by a controllable flap, a plate or the like, and the feed members arranged just before the cutting tool are reversible or can be moved into a neutral position, releasing the cover strip material.

For connection of the end of a consumed delivery roll lying in the guide channel with the lead of the next delivery roll, in another configuration of the invention, a welding device can be arranged on the part of the guide channel adjacent to the feed passages.

The invention will be explained in greater detail hereinafter relative to the drawings, in which.

Figure 1:
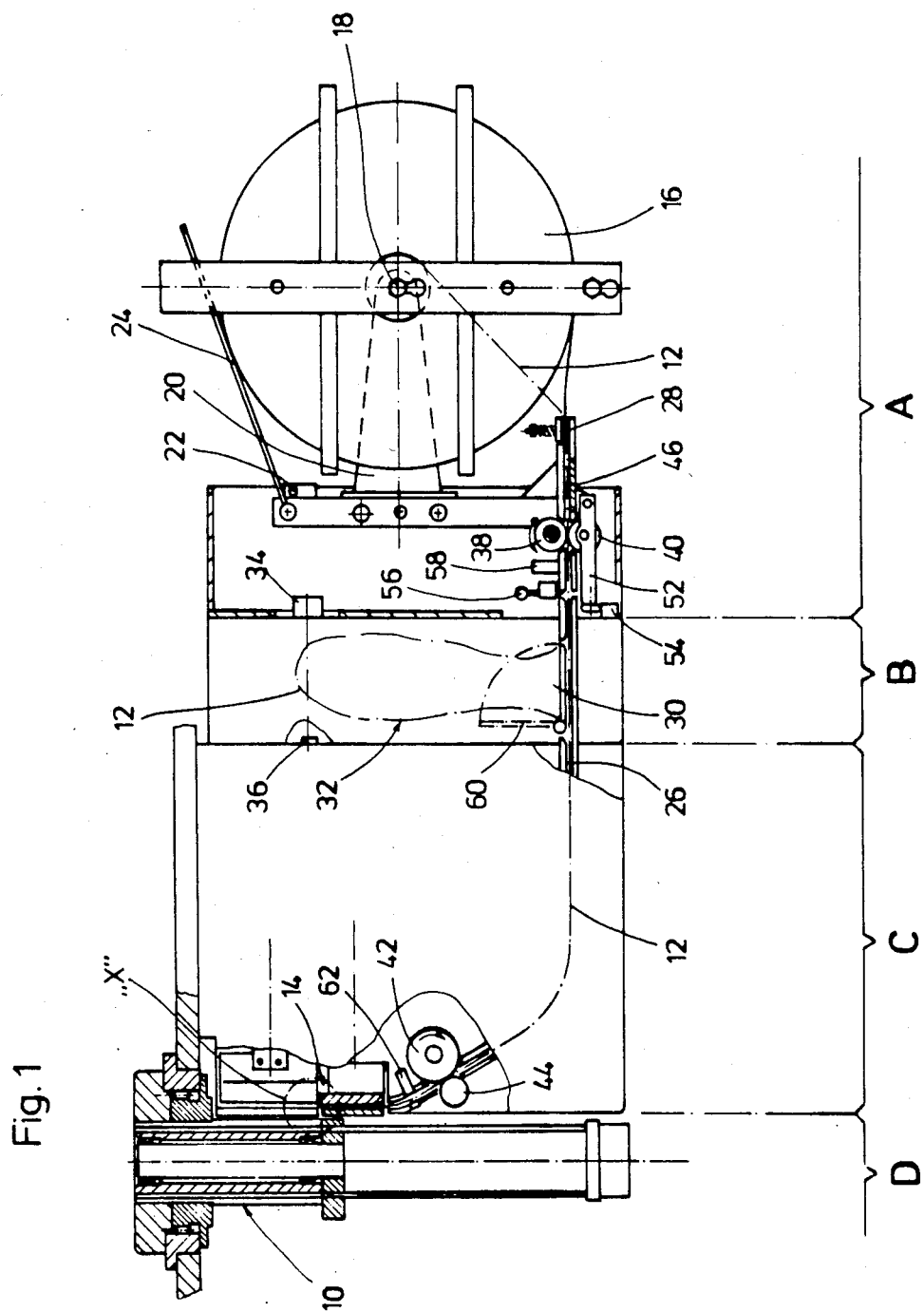
FIG. 1 is a simplified side view of a device for the production of cover strips.

The bottom part 10 of an insertion tool is shown in FIG. 1, to which are fed cover strips of insulating material, which are inserted in the stator grooves during drawing of wire windings into stators of electric machines. Tools of this type are generally known and are described, for example, in published European Patent Application No. 81109516.5 (Published Specification No. 0051858) and DE-OS No. 2947371. The lengths of the cover strips are adjusted according to the heights of the stator lamination plates for which they are intended, and are changed correspondingly, if various stator lamination plates having different heights are treated one after the other on the same insertion device. A cutting tool 14 on insertion tool 10, which is shown in larger scale in FIG. 4, serves for separation of the cover strips from the original strip material 12.

It should be noted that the present invention does not address the type and position of the tool part on which cutting tool 14 is arranged. In one very useful embodiment the tool part forms a cover strip storage, which then simultaneously carries all of the cover strips to be inserted in the stator grooves around the periphery. This cover strip storage is customarily found under the insertion tool of a winding insertion station. It is also possible, however, to insert the separate cover strips of certain lengths, which are obtained by separation of the strip-like original material, individually into the top part of an insertion tool, which can be done for example with movable insertion tool top parts which are already at the winding station. These variations of the insertion tools do not form a part of the present invention, because they relate to the passage of the cover strips only between the delivery roll indicated by 16 in FIG. 1 and the cutting tool 14 for separation of individual cover strips of certain lengths from the original strip material coming from delivery roll 16.

Delivery roll 16 can normally rest rotatably on an axis 18. Axis 18 is part of a delivery roll holder 20, which provides that delivery roll 16 can be easily changed. An indicator or switching device 22 with a sensor is mounted on holder 20, which device is operated by a pivoting rod 24, engaging on delivery roll 16. The degree of inclination of rod 24 could also serve as a measure of the length of product remaining on roll 16. If delivery roll 16 is consumed and must be exchanged for a new delivery roll, switching device 22 produces a switching signal, which until now served only to stop the entire device, but henceforth, in accordance with the present invention, is now to be used for the automatic exchange of the delivery rolls.

The strip material is conducted through a guide channel 26 to cutting tool 14. A felt brake 28, of adjustable friction force, is located at the beginning of guide channel 26.

Further on, guide channel 26 has an opening 30, through which strip material 12 comes out of guide channel 26 and forms a loop 32. Whether loop 32 falls below a certain minimum allowable size can be determined by light sensor means 34 with a reflector 36.

Cover strip material 12 is conveyed through a first pair of transport rolls 38, 40, which is arranged in the direction of forward movement following felt brake 28, between delivery roll 16 and loop 32. Cover strip material 12 is drawn out of loop 32 through a second pair of transport rolls 42, 44, and is fed to cutting tool 14. Each of the two pairs of transport rolls includes a feed roll, 38 or 42, respectively, and a pressing roll 40, 44, respectively, between which the cover strip material is guided. Feed roll 38 is driven in both directions of rotation. The feed of cover strip material 32 in one direction or the other by feed roll 38 depends upon whether pressing roll 40 of cover strip material 12 presses against feed roll 38.

Feed roll 42 can be driven in either direction of conveyance of cover strip material 12 to cutting tool 14. In order to pull cover strip material 12 back, either pressing roll 44 is lifted from feed roll 42 or they are both driven in reverse.

Figure 2:
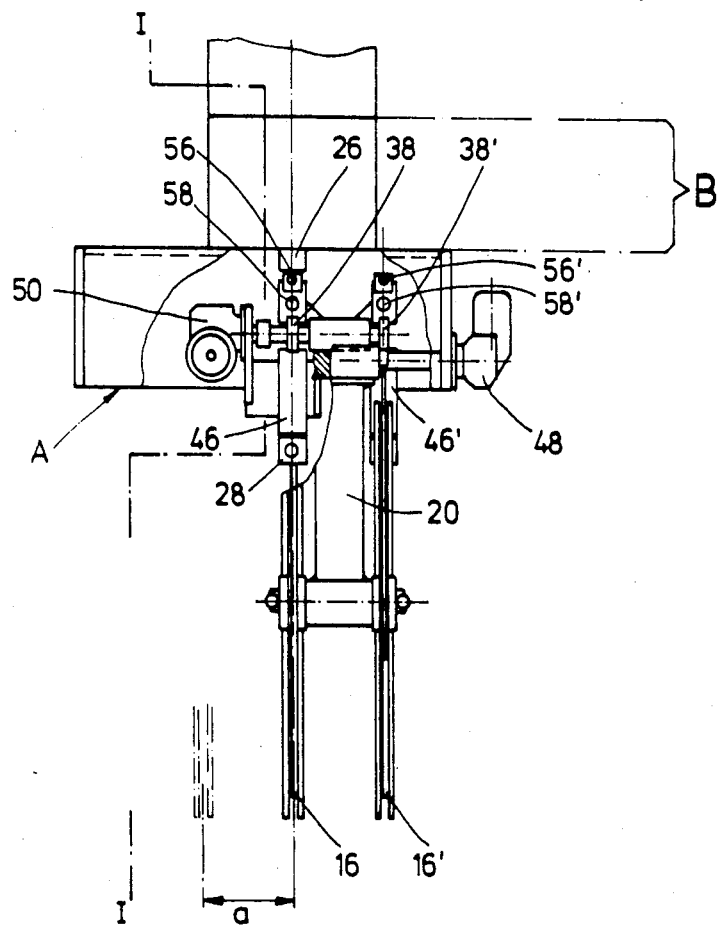
FIG. 2 is a plan view of the device of FIG. 1.

As shown in FIG. 2, the device has a holder 20 for two delivery rolls 16, 16'. Holder 20 for the two delivery rolls, having two feed passages 46, 46' forms a side changing mechanism which can be moved with the two delivery rolls. While only two delivery rolls 16, 16' are provided in the example, and correspondingly the changing mechanism can be set only in two positions (in FIG. 2, the second position is shown in broken line), three or more delivery rolls and a corresponding number of positions of the changing mechanism could be provided without further difficulty. In each of these positions, the feed passage 46 or 46' associated with one delivery roll is in alignment with the adjacent part of guide channel 26 and together with this channel forms the entire guide channel between delivery roll and cutting tool 14. With the roll change, the changing mechanism moves to the side, so that the other feed passage, e.g. 46' can be connected to the guide channel 26. The setting mechanisms for the side adjustment in both directions of the changing mechanism is indicated at 48 in FIG. 2. The setting mechanism can be either a hydraulic or an electromechanical setting mechanism.

A pair of transport rolls with a feed roll 38 or 38' is associated with each feed passage 46 or 46'. All of the feed rolls of the different feed passages could have a common drive 50. The rotation of feed rolls 38, 38' alone does not itself cause coveyance of strip material 12. This is done when the relevant pressing roll 40 is pressed (neither associated pressing roll is shown in FIG. 2). In the embodiment which is shown, the construction is such that pressing roll 40 as well as the other, non-illustrated, pressing roll is mounted separately on a pivot arm 52, which then, if the relevant feed passage 46 or 46' comes into alignment with the other part of guide channel 26, runs with its free end on a cam 54 which presses pivot arm 52 and thus also pressing roll, e.g. 40, upward against feed roll e.g. 38. Thus, despite simultaneous drive of all feed rolls 38, 38', mounted on the same shaft of drive 50, only that feed roll which is positioned in the main part of guide channel 26 conveys cover strip material 12 in one direction or the other.

Each feed passage 46 or 46' has a felt brake similar to felt brake 28 shown in FIG. 1 at its front end and at its rear has a manually or mechanically operated cutter 56 or 56'. These cutters 56, 56' associated with each feed passage 46, 46' are a part of the changing mechanism which can be moved to the side, which is as A in FIGS. 1 and 2. Sensors 58 or 58', e.g. light barriers, are associated with each feed passage 46, 46', the use of which detects the presence of cover strip material in relevant feed passage at that point at which sensor 58 or 58' is found.

A loop unit B is shown behind the movable changing mechanism A in FIG. 1, which as a special feature has a flap 60 shown in broken line in open position, which can close the opening 30 to guide channel 26. Instead of flap 60, a plate or another closing member could also be provided for opening 30.

The unit C adjacent to unit B in FIG. 1 includes an essentially customary cover strip mechanism, as is described in the aforementioned DE-OS No. 29 47 371. A special feature however is that the feed members 42, 44 must allow conveyance of cover strip material 12 in reverse direction, e.g. by lifting pressing roll 44 from feed roll 42, and reversing roll 42. Also, another sensor 62, e.g. likewise in the form of a light barrier, is arranged downstream of transport rolls 42, 44, to indicate the presence of cover strip material at that point.

Unit D of FIG. 1 need not be described in further detail herein, since it relates to a known cover strip insertion tool, on which no changes need be undertaken in reference to the invention.

FIGS. 1 and 2 show the device to carry out the method according to the invention, as follows:

In FIG. 2, the feed passage 46 is in alignment with the main part of guide channel 26. Feed roll 38 is then driven intermittently by drive mechanism 50, if light barrier 34 indicates that the lowest level of loop 32 has been passed. Then the pair of transport rolls 38, 40 draws more cover strip material 12 down from the delivery roll 16 and engages loop 12. Independent of the drive of feed roll 38, the pair of transport rolls 42, 44, in a certain cycle in the work cycle of an insertion tool 10, intermittently draw cover strip material 12 from loop 32 and feed it past cutting tool 14 to the cover strip tool. Cutting tool 14 separates the cover strips into predetermined lengths of cover strip material 12 in a known manner. The separated cover strips are moved along into the cover strip storage of the insertion tool, so that more cover strip material is moved by transport rolls 42, 44 past cutting tool 14, and another cover strip can be separated, and so on This process, as described above, is known.

The special feature of the present invention resides in that during the continuous consumption of delivery roll 16, a new delivery roll 16' is set in position on changing mechanism A shown in broken lines in FIG. 2. The machine need not be stopped for this. The lead of the cover strip material from delivery roll 16' is threaded manually into feed passage 46', until the outermost end can be cut off cleanly by cutter 56'. The cover strip material from delivery roll 16' remains in this position until delivery roll 16 is consumed. Then the sensor 22, 24 indicates the end of roll 16 and disconnects the insertion device and the cover strip tool. Feed roll 38 is then driven in reverse, while pressing roll 44 is lifted from feed roll 42 or is also driven in reverse. Thus the end of cover strip material 12 from delivery roll 16 lying in guide channel 26 and forming loop 32 is drawn back out of the part of guide channel 26 connected with feed passage 46, and then felt brake 28 can be operated by means of an electromagnet.

As soon as sensor 58 indicates that the end of cover strip material 12 of the consumed roll 16 has been drawn sufficiently far back, changing mechanism A moves to the side for the distance "a", so that delivery roll 16 moves into the position shown in broken lines in FIG. 2 and the new delivery roll 16' together with the associated feed passage 46' comes into alignment with the main part of guide channel 26. With this side movement, pivot arm 52 of pressing roll 40 runs down from cam 54, and the pivot arm associated with feed roll 38' runs onto cam 54, so that henceforth the cover strip material of new delivery roll 16' presses lightly against feed roll 38' and is carried along by its rotary movement.

Finally, feed roll 38' feeds the cover strip material through guide channel 26 to cutting tool 14. Flap 60 should then be closed. Also, pressing roll 44 should be separated from feed roll 42 or should rotate around it in the feed direction. As soon as sensor 62 indicates that cover strip material 12 has been moved that far, transport rolls 42, 44 tightly hold the front end of cover strip material 12 passing thereby, and it will open flap 60. Then feed roll 38' produces a new loop 32. The device is ready to start as soon as light sensor 34 indicates the presence of a sufficiently large loop 32. The distance of sensor 62 from cutting tool 14 is set with reference to the drive control device of feed roll 42 in the production of the first cover strip following an exchange of delivery rolls.

Flap 60 can be deleted, if care is taken while guiding the cover strip material in the area of opening 30 that the front end of a new strip of material remains in guide channel 26, and loop 32 is not formed until transport rolls 42, 44 have grasped the material.

Figure 3:
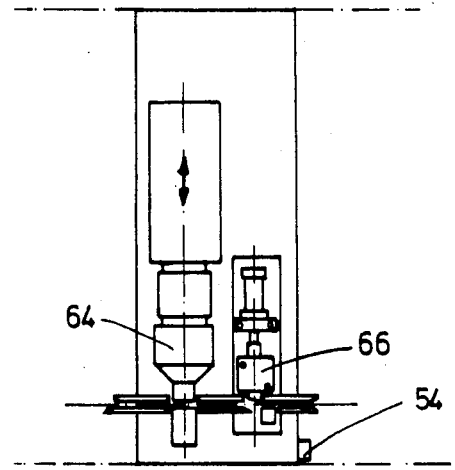
FIG. 3 shows a welding device usable with the embodiment of FIG. 1.

Following consumption of delivery roll 16, when the end lying in guide channel 26 is to be welded to the lead of the next delivery roll 16', as shown in FIG. 1, the indicated device of the unit shown in FIG. 3 is interposed between the two units A and B. This includes an ultrasonic welding device 64 and a controllable cutting device 66, of which the cutting blade can be operated by heavy duty cylinders. The method implemented with this device corresponds in the first part to the presently described method. However, if delivery roll 16 runs to the end, the control device has the function of disconnecting light sensor 34, and thus care must be taken that loop 32 is formed. This is possible without difficulty, because the consumed delivery roll 16 no longer includes any disturbing inertial mass. After loop 32 has been formed, the device comes to a stop and cutting device 66 cuts the end of the cover strip material lying in guide channel 26 from roll 16. Then feed roll 42 draws the cut edge from cutting device 66 to welding device 64. Changing mechanism A moves to the side until the new delivery roll 16' and its feed passage 46' is aligned with the main part of the guide channel 26. Then feed roll 38' moves the lead of new delivery roll 16' as far as welding device 64, so that the end of moving roll 16 lying in guide channel 26 can be welded with shorter overlap together with the lead of new delivery roll 16'. Finally, the production of more cover strips starts up again and the control device of feed roll 42 for the production of the first cover strip following the change takes care of the movement of the front end of the cover strip material in relation to cutting tool 14, undertaken on account of the welding process.

The weld point forms a thickening of the cover strip material. Then it is normally desirable that, with the separation of the individual cover strips, the thickening goes to the outside end of a cover strip. In this manner, it disturbs neither the cover strip ending tool, shown in FIG. 4 in large scale, nor the stator.

Figure 4:
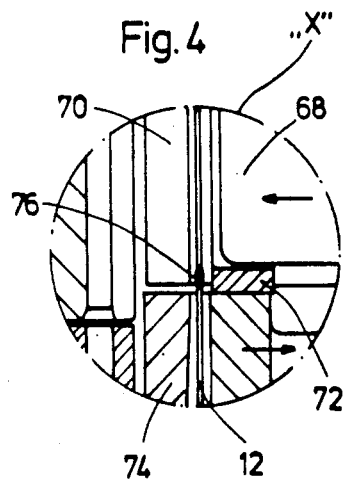
FIG. 4 shows a portion of FIG. 1 on an enlarged scale.

To show the ratios, FIG. 4 shows cutting tool 14 and cover strip bending tool. The bending punch and the bending strip of the cover strip bending tool cooperating with the punch are indicated at 68 and 70. Cutting tool 14 consists of a narrow stationary cutting part 72 and a movable cutting part 74. FIG. 4 shows that the change of delivery rolls 16, 16', weld point 76 of FIG. 4 should be arranged so that during the cutting process it engages directly on stationary cutting part 72 of cutting tool 14. In this position, weld point 76 does not come between bending punch 68 and bending strip 70 and is located directly at the end of a cover strip.

Since the length of guide channel 26 is known, the feed control of the strip of material for the welding process adds no difficulty, and the end lying in guide channel 26 before being cut off is drawn back through cutting device 66 until the weld point comes to the position shown in FIG. 4, upon return of the device following the welding.

It is to be understood that the invention is not limited to the precise embodiment which is shown. The rolls indicated solely as transport rolls 42, 44, could also be used for preswaging of the cover strip. Some other type of feed member could also be used, e.g. clamping the material strips and feeding the material in stages, controlled by pawls. The changing mechanism A also need not necessarily have transport rolls at each feed passage 46, 46', and especially the parallel feed rolls 38, 38' need not all turn simultaneously. The invention discloses solely that the lead of a new delivery rolls 16, 16' can be threaded without interruption of the work into a feed passage 46, 46', and then can be held in a definite position so that then with the change of delivery rolls 16, 16', the lead of the material of the new delivery roll can be introduced very rapidly into the correct position with relation to the main part of guide channel 26, without handling by the operator, and can be picked up by the feed members. In certain cases, it may therefore suffice if only transport rolls 38, 40, which can be separated, are found in alignment with the main part of guide channel 26, so that the different feed passages 46, 46', which in this case have an interruption in the area of transport rolls 38, 40, need be brought into alignment with the main part of guide channel 26.

Of course, the invention also is not limited merely to side movement of changing mechanism A, in order to bring the different feed passages 46, 46' individuallly into connection with the main part of guide channel 26 one after the other. This relative movement e.g. could also occur perpendicular to or through a rotary movement of changing mechanism A around a pivot center, insofar as changing mechanism A does not stand still, and the connection change occurs by movement of at least a part of the main guide channel 26.

We claim:

1. In a method for producing cover strips to be inserted into grooves of stators of electric machines, wherein the strips are provided as strip material on a delivery roll and delivered from a delivery roll through a main guide channel by means of feed members to a cutting tool where the strip material is cut into strips, the improvement comprising:

providing strip material on a plurality of delivery rolls, the strip material from each delivery roll passing through a feed passage associated therewith which receives the strip material delivered from that roll, supplying strip material from a first one of said delivery rolls through its respective feed passage to the main guide channel, and subsequently switching to deliver strip material to the main guide channel from a second delivery roll instead of from the first delivery roll, said switching comprising effecting relative movement between said main guide channel on the one hand and said feed passages on the other hand, to effect non-alignment of the feed passage of the first delivery roll from the main guide channel and to align the feed passage of the second delivery roll with the main guide channel, withdrawing a trailing end of the strip material from the first delivery roll out of the upstream end of the main guide channel before delivering the strip material of the second delivery roll to the main guide channel, and then delivering the strip material from the second delivery roll through its respective feed passage and into the main guide channel.

2. The method of claim 1, including the step of welding the trailing end of the strip material from the first delivery roll to the leading end of the strip material of the second delivery roll.

3. The method of claim 2, including withdrawing the trailing end of the strip material of the first delivery roll out the upstream end of the main guide channel to a predetermined length, cutting said strip material from the first delivery roll at a predetermined point and welding the remaining trailing end to the leading end of the strip material of the second delivery roll, and arranging the welding point such that it is located at one end of a cover strip subsequently inserted into a said groove.

4. The method of claim 1, wherein the main guide channel is stationary and said relative movement comprises moving said plurality of delivery rolls, as a unit, between a plurality of different positions relative to the main guide channel, each position corresponding to delivery of strip material from one of said delivery rolls to the main guide channel.

5. The apparatus for producing cover strips to be inserted into grooves of stators of electric machines, comprising:

a plurality of delivery rolls, each providing a supply of strip material, each delivery roll having a feed passage associated therewith for delivering strip material from its respective delivery roll, a main guide channel for receiving strip material individually from each of said feed passages and for delivering the strip material to a cutting tool, and means for positioning each of said feed passages separately into alignment with said main guide channel by effecting relative movement between the main guide channel on the one hand and said feed passages on the other hand, each feed passage including a drive means having means for driving the strip material forwardly, toward the main guide channel and also in the reverse direction.

6. An apparatus according the claim 5, wherein the plurality of feed passages are operatively connected together for movement together, relative to the main guide channel, to position each of the feed passages into alignment with the main guide channel.

7. An apparatus according the claim 6, including holder means for mounting the delivery rolls, said holder means and hence also said delivery rolls, being movable together with said feed passages.

8. An apparatus according the claim 5, including a cutting means arranged in each feed passage at the downstream end thereof.

9. An apparatus according the claim 5, including a welding device arranged in the main guide channel for welding together the trailing end of the strip material of a first delivery roll to the leading end of strip material on a delivery roll arranged to deliver strip material to the main guide channel after the strip material from the first set delivery roll.

10. The apparatus for producing cover strips to be inserted into grooves of stators of electric machines, comprising:

a plurality of delivery rolls, each providing a supply of strip material, each delivery roll having a feed passage associated therewith for delivering strip material from its respective delivery roll, a main guide channel for receiving strip material individually from each of said feed passages and for delivering the strip material to a cutting tool, means for positioning each of said feed passages separately into alignment with said main guide channel by effecting relative movement between the main guide channel on the one hand and said feed passages on the other hand, and wherein at least the feed passage in alignment with the main guide channel includes transport rolls for driving strip material both forwardly and rearwardly.

11. The apparatus for producing cover strips to be inserted into grooves of stators of electric machines, comprising:

a plurality of delivery rolls, each providing a supply of strip material, each delivery roll having a feed passage associated therewith for delivering strip material from its respective delivery roll, a main guide channel for receiving strip material individually from each of said feed passages and for delivering the strip material to a cutting tool, and means for positioning each of said feed passages separately into alignment with said main guide channel by effecting relative movement between the main guide channel on the one hand and said feed passages on the other hand, said main guide channel having a side opening closable by a controllable flap, a chamber adjacent said side opening positioned to form a loop of said strip material, a first strip material drive means in at least that feed passage in alignment with the main guide channel and a further drive means downstream from said side opening adjacent the said cutting tool, said further drive means having means for driving the strip material forwardly or in reverse, and said further drive means also having a neutral non-drive position.

* * * * *